United States Patent [19]

Sheppard

[11] Patent Number: 4,750,378

[45] Date of Patent: Jun. 14, 1988

[54] BALL SCREW MECHANISM

[76] Inventor: Peter H. Sheppard, P.O. Box 459, Hanover, Pa. 17331-0459

[21] Appl. No.: 930,257

[22] Filed: Nov. 13, 1986

[51] Int. Cl.$^4$ .............................................. F16H 25/22
[52] U.S. Cl. ................................... 74/424.8 R; 74/459
[58] Field of Search ............... 74/424.8 R, 89.15, 459, 74/424.8 NA, 216.3; 384/508

[56] References Cited

U.S. PATENT DOCUMENTS

| | | | |
|---|---|---|---|
| 3,143,896 | 8/1964 | Edwards | 74/459 |
| 3,148,922 | 9/1964 | Roessler, Jr. | 384/508 |
| 3,161,073 | 12/1964 | Deutsch et al. | 74/424.8 R |
| 3,372,605 | 3/1968 | Orner | 74/459 |
| 3,667,311 | 6/1972 | Wysong | 74/424.8 R |
| 3,826,153 | 7/1974 | Sheppard . | |
| 3,850,046 | 11/1974 | Nilsson | 74/459 |
| 3,924,486 | 12/1975 | Taillardat | 74/424.8 R |
| 3,971,264 | 7/1976 | Detraz et al. | 74/424.8 R |
| 4,272,476 | 6/1981 | Benton | 74/459 |
| 4,597,305 | 7/1986 | Brusasco | 74/89.15 |
| 4,604,911 | 8/1986 | Teramachi | 74/424.8 R |

FOREIGN PATENT DOCUMENTS

| | | | |
|---|---|---|---|
| 693160 | 8/1964 | Canada | 74/424.8 R |
| 2809647 | 10/1978 | Fed. Rep. of Germany | 74/424.8 R |
| 54-45453 | 4/1979 | Japan | 74/216.3 |

Primary Examiner—Lawrence Staab
Attorney, Agent, or Firm—King and Schickli

[57] ABSTRACT

An easily fabricated and assembled ball-screw mechanism of compact design comprises a cylindrical member having a helical guideway on its inner circumferential surface. The cylindrical member is operatively engaged through bearing members with a screw member having a helical groove in opposed relationship with the helical guideway. A tubular bearing return connecting each end of the helical guideway is freely received in a cavity in the cylindrical member. Each end of the tubular bearing return has a ramp which cooperates with the helical guideway to receive and release the bearing members. The bearing members are held captive in the tubular ball return and between the helical groove and helical guideway. An aperture is located in the tubular bearing return for loading the bearing members. A keeper is received in the cylindrical member to retain the tubular bearing return and includes a node to guide members across the bearing loading aperture.

12 Claims, 2 Drawing Sheets

BALL SCREW MECHANISM

BACKGROUND OF THE INVENTION

The present invention relates to a ball-screw mechanism, and more particularly, to an improved ball-screw mechanism which is easily assembled and of compact design.

Presently, the ball return means in known ball-screw mechanisms consists of either an external return tube or a helical return guideway. The external return tube consists of some form of tubular ball catching member which conveys the ball from one end of the ball race back to the other. The tubes are located externally and are bolted onto the mechanism with clips and screws. This external hardware is, obviously, quite susceptible to damage from a variety of sources and is relatively expensive to fabricate. The extra hardware required to support the tube also defeats any compactness which may be required, such as in integral power stearing gears.

The helical return guideway as shown in my U.S. Pat. No. 3,826,153 avoids the problems of the external return tube. Although the helical return guideway provides significant improvements, continued research and development has shown particular aspects that may be further improved. The helical return guideway requires more bearing members due to the increased return path length. It also requires machining of end discs to transfer the balls into the return race. The helical return further requires a loading sleeve for loading the bearing members and a threaded locking member to hold the machined parts in place.

The present invention alleviates these requirements by utilizing unique fabricated parts which require no bolts, clips, or screws for assembly. Since all of the parts of the present invention interfit with each other, there is no need for any additional hardware and the mechanism is easily assembled.

Because the return tube of the present invention takes a more direct route than the helical guideway, fewer bearing members are required and, thus, the invention is more economical and durable. Furthermore, the bearing members of the present invention may be loaded directly into the return tube without the necessity of a loading sleeve or other apparatus. This obviously increases the efficiency and economy of assembling the mechanism.

By eliminating the need for external parts, the present ball-screw mechanism provides a compact design. Such a compact design makes the present invention ideal for use in steering gear pistons, as well as any other application where compactness and smooth operation must be combined with reliability. This invention, therefore, broadly concerns a compact ball-screw mechanism capable of smooth, reliable operation under a wide range of conditions.

SUMMARY OF THE INVENTION

Accordingly, it is a primary object of the present invention to provide an improved ball-screw mechanism of compact design.

Another objective of the present invention is to provide an easily fabricated ball-screw mechanism which is capable of easy assembly.

A further objective is to provide a ball-screw mechanism capable of smooth operation.

Still another objective of the present invention is to provide a ball screw mechanism in which the ball bearings may be loaded without the requirement of a separate loading apparatus.

Still another objective of the present invention is to provide a ball-screw mechanism which requires no bolts, clips, screws or other hardware for assembly.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

In order to achieve the foregoing and other objects, and in accordance with the purposes of the present invention as described herein, an improved compact ball-screw mechanism is provided with all fabricated parts capable of compact assembly, and providing smooth operation. A screw member having a helical groove is received in a hollow cylindrical member with a helical guideway on the inner circumferential surface. The helical groove and helical guideway are in opposing relationship such that the screw member is operatively engaged with the cylindrical member through captive balls, as will be seen in more detail below. The outer circumferential surface of the cylindrical member has a cavity which connects each end of the helical guideway of the inner circumferential surface. A tubular bearing return assembly is received in the cavity and thus connects the ends of the helical guideway. A keeper is also received in the cavity on the outer circumferential surface to retain the tubular bearing return in place.

The operative interconnection of the screw member and the cylindrical member is provided by the set of balls or bearing members. The bearing members are held captive between the helical guideway and helical groove and also in the tubular bearing return assembly. The balls actually fill this entire endless path, thus completing the ball screw mechanism.

The cavity may be skewed with respect to the longitudinal axis of the cylindrical member so that the direction of the bearing members moving through the tubular bearing return received therein is not abruptly or substantially changed. The tubular bearing return is generally U-shaped to form this path as short as possible and so that the bearing members are received in one end, transferred through the bearing return tube and transmitted immediately back to the helical guideway and groove at the other end. A ramp is provided at each end of the tubular bearing return to provide for smooth receipt or transmission of the bearing members to or from the helical guideway and groove.

The bearing return is split into substantially U-shaped halves along a plane passing through a longitudinal axis. Easy stamping or molding and finishing of the parts is provided by this feature. Since the halves are interchangeable, and are simply slipped into the cavity together to provide the tubular structure without any other assembly or use of fasteners, the economy of the design is further enhanced. The cooperating halves are thus freely received and retained by the confines of the cavity and by the keeper which is also freely received in the cavity.

The bearing return also has an aperture for loading the bearing members. This facilitates assembly of the mechanism since the bearing members can be simply dropped into the bearing return prior to insertion of the keeper. The bearing members move into the helical guideway and groove until the guideway, groove and return are full. Assembly of the mechanism is completed with the simple insertion of the keeper into the cavity.

The keeper has an outer surface contoured to conform to the outer circumferential surface of the cylindrical member. This feature of the contoured keeper makes the present invention ideal for use as a piston in power steering gears, as well as any other application where the contacting surface will hold the keeper in place.

The keeper has a grooved inner surface to match the tubular bearing return. A node is formed on the grooved inner surface of the keeper to be received in the aperture of the bearing return, thus providing a smooth inner surface for the tubular bearing return.

The cross section of the tubular bearing return is substantially round and the cross section dimension is substantially the same as the cross section dimension of the bearing members, thus enhancing the smooth operation of the ball screw mechanism of the present invention.

Still other objects of the present invention will become readily apparent to those skilled in the art from the following description wherein there is shown and described a preferred embodiment of this invention, simply by way of illustration of one of the modes best suited to carry out the invention. As it will be realized, the invention is capable of other, different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of this specification, illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE INVENTION

Figure 1:
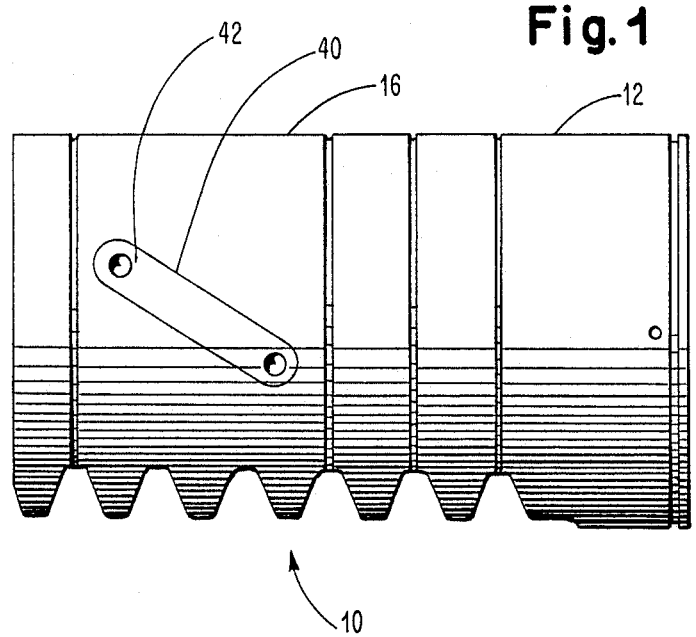
FIG. 1 is a side view of a piston of a power steering gear incorporating the ball-screw mechanism.
Figure 2:
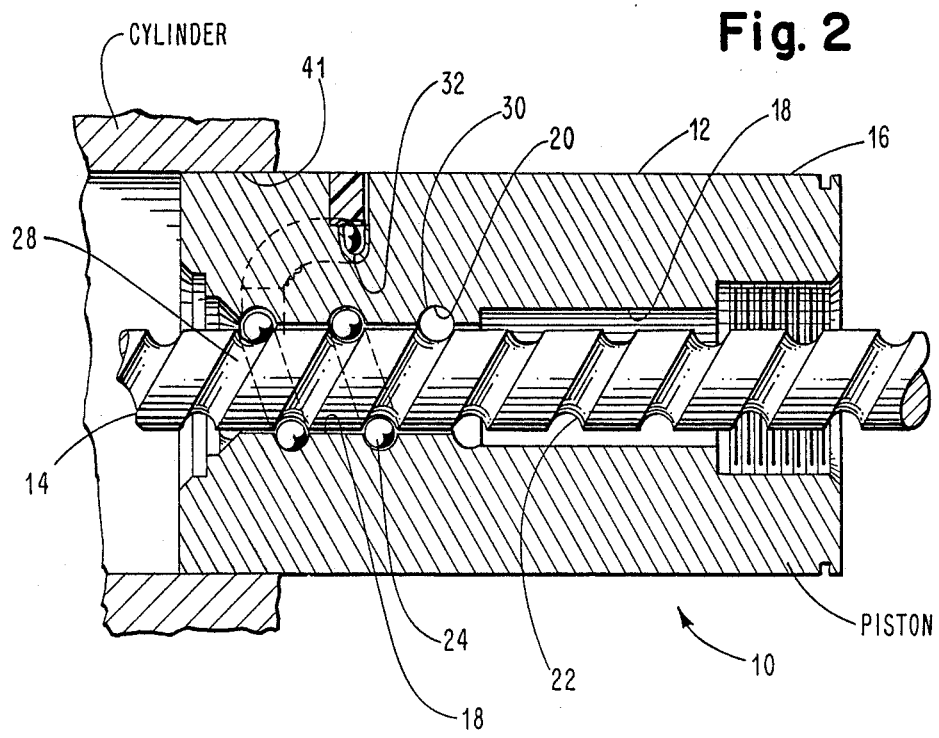
FIG. 2 is a longitudinal cross-sectional view of the piston and the ball-screw mechanism.
Figure 3:
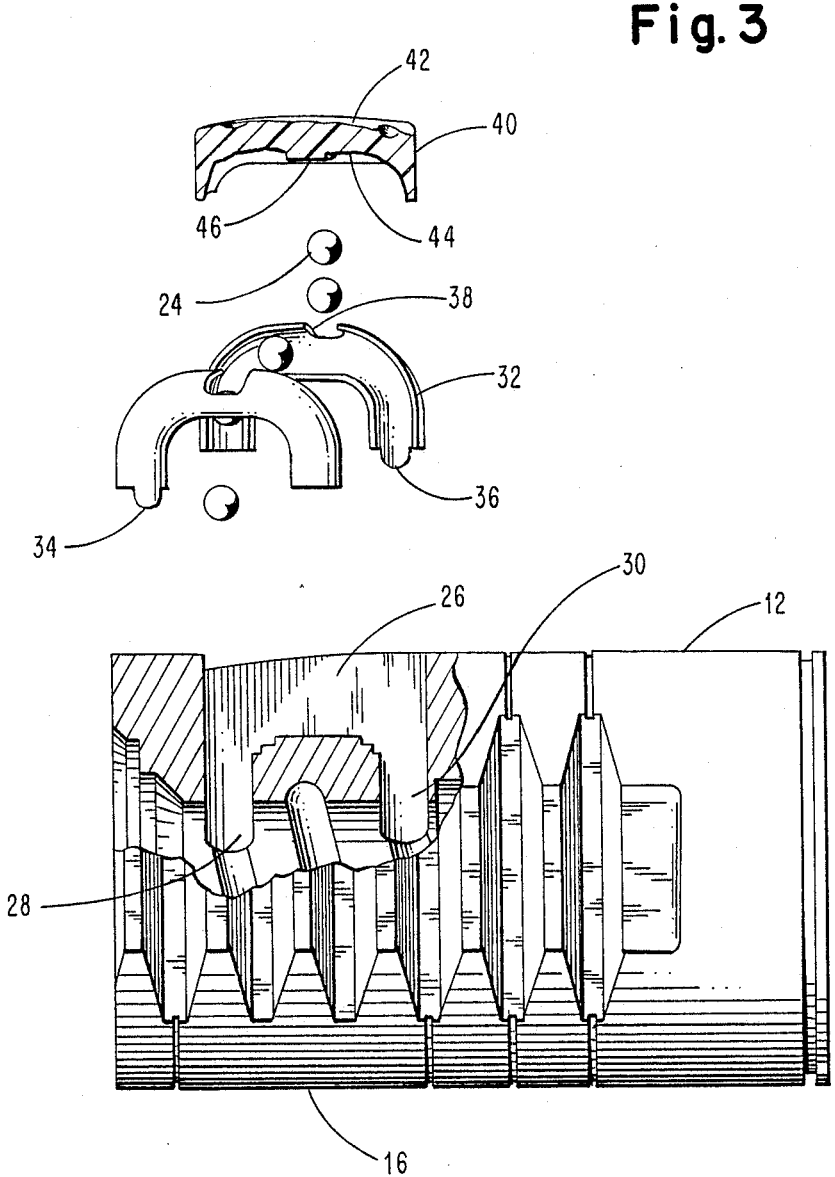
FIG. 3 is an exploded side view of the piston with a fragmentary sectional view of the ball-screw mechanism.

Reference is now made to FIGS. 1–3, and initially to FIGS. 1 and 2 showing an improved, compact ball-screw mechanism 10 comprising a hollow cylindrical member 12, such as a power steering piston, and a screw member 14, such as an input shaft. The hollow cylindrical member 12 has an outer circumferential surface 16 and an inner circumferential surface 18. A helical guideway 20 is machined on the inner circumferential surface 18 and a helical groove 22 is machined on the screw member 14. The helical guideway 20 is machined to be in cooperative relationship with helical groove 22 on screw member 14. The cooperative relationship includes pitch, as well as depth.

Thus, as shown in FIG. 2, the screw member 14 is received in the cylindrical member 12 and a set of balls or bearing members 24 are held captive between the groove 22 and the guideway 20 to establish a driving relationship between the screw member 14 and the cylindrical member 12. The guideway 20 is machined to a depth which will accommodate bearing members 24 when said members 24 are positioned in helical groove 22. As seen in the embodiment shown by FIG. 2, the total clearance between guideway 20 and groove 22 is substantially equal to the diameter of the members 24.

As shown in FIG. 3, a cavity 26 is machined in the outer circumferential surface 16 of cylindrical member 12. The cavity 26 connects opposite ends 28 and 30 of the helical guideway 20. A tubular bearing return 32 is received in the cavity 26 and connects opposite ends 28 and 30 of the helical guideway 20. The bearing members 24 are also held captive in the tubular bearing return 32. During cooperative movement of the screw member 14 with respect to cylindrical member 12, the bearing members 24 move along an endless path through helical guideway 20 about helical groove 22 and back through tubular bearing return 32.

The cavity 26 and the tubular bearing return 32 received therein may be skewed with respect to the longitudinal axis of the cylindrical member 12 so that the direction of the bearing members is not abruptly or substantially changed as they move from the helical guideway 20 into the tubular bearing return 32. The tubular bearing return 32 is substantially U-shaped to provide for smooth movement of the bearing members 24. Ramps 34, 36 are provided on each end of the bearing return 32 to extend down into the groove 22 to provide for smooth receipt or lead-in transition of the bearing members 24.

The cross section of the tubular return 32 is substantially round to conform to the cross section of the bearing members 24, and the cross sectional dimension of the bearing return 32 is slightly larger than the diameter of the bearing members 24 to provide for smooth operation. Preferably, the bearing return 32 is split into substantially U-shaped halves along a plane passing through a longitudinal axis. This provides for simple economic production of the bearing return 32. The size of the cavity 26 is such that the halves of bearing return 32 are held in cooperating relationship when freely received in the cavity 26. A bearing loading aperture 38 allows placement of the bearing members 24 into the ball-screw mechanism 10 during assembly. The bearing members 24 move through the bearing return 32 and into the helical guideway 20 and groove 22 until the guideway 20, groove 22 and bearing return 32 are filled with bearing members 24. The halves of the bearing return 32 are inexpensively stamped out of sheet metal or molded from powdered metal and rough finished along the mating edges by grinding.

The bearing return 32 is held in place in the cavity 26 by a keeper 40 which is also freely received in the cavity 26. As best shown in FIGS. 1 and 3, the keeper 40 is designed to be substantially coextensive with and overlie the bearing return 32. The keeper 40 is preferably molded of high density plastic and has an outer surface 42 which is contoured to conform to the outer circumferential surface 16 of the cylindrical member 12. The keeper 40 is slipped into the cavity 26 where it is held in place by the walls of the cavity 26 and a contacting surface encasing the cylindrical member 12, such as the cylinder wall 41 of a power steering gear.

The keeper snugly but freely engages the tubular bearing return 32 so that it is held in place without any bolts, screws, clips, or other hardware. Due to internal oil pressure, a thin film of oil surrounds the keeper 40, in effect providing free-floating action that prevents binding action on the bearing members, and attributes to the desired smooth operation.

The keeper 40 has a grooved inner surface 44 to match the tubular bearing return 32. A node 46 is formed on the grooved inner keeper surface 44 for receipt in the bearing loading aperture 38 when the keeper 40 is in place in the cavity 26 and freely engaging the tubular bearing return 32. The node 46 provides a smooth inner guide surface for the bearing members in tubular bearing return 32, thus enhancing the smooth operation of the present invention.

In operation, bearing members 24 are held captive by the groove 22 and guideway 20 forming the operative thread of the mechanism. Assuming clockwise rotation of the screw member 14, the bearing members 24 one-by-one follow groove 22 and intersect ramp 34 whereby said bearing members 24 are transferred into the tubular bearing return 32. After sufficient rotation, the bearing members 24 then pass through tubular bearing return 32, are guided across the node 46 and are then finally transferred into groove 22 by ramp 36. When the screw member 14 is rotated in the opposite direction, the bearing members 24 move in the opposite direction.

In summary, a durable, compact ball-screw mechanism 10 is disclosed which is easily fabricated and assembled. The ball-screw mechanism comprises a screw member 14 received in a cylindrical member 12 and a set of bearing members 24, held captive between a helical groove 22 on screw member 14 and a helical guideway in cylindrical member 12. During operation, the bearing members 24 are returned from opposite ends 28 and 30 of the helical guideway 20 by a tubular bearing return 32. In accordance with the invention, the bearing return 32 is freely received in a cavity 26 of the cylindrical member 12 and held in place by the free floating keeper 40. The keeper 40 has an outer surface 42 contoured to match the outer circumferential surface 16 of cylindrical member 12, and is held in position by engagement within a cylinder by the cylinder wall 41 without the need for fasteners or the like.

The foregoing description of a preferred embodiment of the invention has been presented for purposes of illustration and description. It is not intended to be exhaustive or to limit the invention to the precise form disclosed. Obviously, many modifications and variations of the present invention are possible in light of the above teachings. The embodiment was chosen and described to provide the best illustration of the principles of the invention and its practical application to thereby enable one of ordinary skill in the art to utilize the invention in various modifications as are suited to the particular use contemplated. It is intended that the scope of the invention be defined by the claims appended hereto.

I claim:

1. A ball-screw mechanism comprising:
   a hollow member with a helical guideway on an inner circumferential surface and a cavity on an outer circumferential surface connecting each end of said helical guideway;
   a screw member having a helical groove; said screw member operatively engaging said hollow member with said helical groove in opposing relationship with said helical guideway;
   a tubular bearing return freely received in said cavity, said bearing return including an aperture for loading bearing members;
   said bearing members held captive along an endless path in said bearing return and between said helical guideway and helical groove; and
   a keeper substantially conforming to the shape of said cavity that is freely received in said cavity to retain the tubular bearing return and close said aperture, said keeper having a contoured outer surface substantially conforming to the outer circumferential surface of said hollow member so that when said keeper is properly positioned within said cavity, said outer surface of said keeper and said outer circumferential surface are substantially continuous.

2. The ball-screw mechanism of claim 1 wherein said cavity is skewed respective to the longitudinal axis of said cylindrical member.

3. The ball-screw mechanism of claim 1 wherein said cavity is substantially U-shaped.

4. The ball-screw mechanism of claim 1 wherein said bearing return has ramp at each end to receive or release said bearing member.

5. The ball-screw mechanism of claim 1, wherein said bearing return is substantially U-shaped.

6. The ball-screw mechanism of claim 5 wherein said bearing return is split into substantially U-shaped halves along a plane passing through a longitudinal axis of the bearing return.

7. The ball-screw mechanism of claim 6 wherein the cross section of said tubular bearing return is substantially round.

8. The ball-screw mechanism of claim 7 wherein the cross section dimension of said tubular bearing return is slightly larger than said bearing members.

9. The ball-screw mechanism of claim 1, wherein said keeper has a grooved inner surface for engagement with said tubular bearing return.

10. The ball-screw mechanism of claim 1, wherein said keeper is formed of molded plastic.

11. The ball-screw mechanism of claim 1 wherein said keeper is substantially coextensive with said tubular bearing return.

12. A ball-screw mechanism comprising:
   a hollow member with a helical guideway on an inner circumferential surface and a cavity on an outer circumferential surface connecting each end of said helical guideway;
   a screw member having a helical groove; said screw member operatively engaging said hollow member with said helical groove in opposing relationship with said helical guideway;
   a tubular bearing return freely received in said cavity;
   bearing members held captive along an endless path in said bearing return and between said helical guideway and helical groove;
   a keeper substantially conforming to the shape of said cavity that is freely received in said cavity to retain the tubular bearing return, said keeper having a contoured outer surface substantially conforming to the outer circumferential surface of said hollow member so that when said keeper is properly positioned within said cavity, said outer surface of said keeper and said outer circumferential surface are substantially continuous;

said bearing return including an aperture for loading said bearing members;

said keeper including a grooved inner surface for engagement with said tubular bearing return and a node formed in said grooved inner surface for receip in said aperture to guide said members.

* * * * *

UNITED STATES PATENT OFFICE
CERTIFICATE OF CORRECTION

Patent No. 4,750,378      Dated June 14, 1988

Inventor(s) Peter H. Sheppard

It is certified that error appears in the above-identified patent and that said Letters Patent are hereby corrected as shown below:

<u>Col. 1</u>

Line 21, delete "stearing" and insert --steering--.

Signed and Sealed this

Eighth Day of November, 1988

Attest:

DONALD J. QUIGG

*Attesting Officer*     *Commissioner of Patents and Trademarks*